United States Patent [19]
Adams

[11] 3,738,666
[45] June 12, 1973

[54] VALVE STEM SEAL ASSEMBLY
[76] Inventor: Harold R. Adams, R.R. 1, St. Francisville, Ill. 62460
[22] Filed: May 15, 1972
[21] Appl. No.: 253,624

[52] U.S. Cl........................ 277/58, 251/366, 277/71
[51] Int. Cl............................................. F16j 15/40
[58] Field of Search .................. 277/58, 59, 70, 71, 277/72, 73, 79; 251/214, 366

[56] References Cited
UNITED STATES PATENTS
| | | | |
|---|---|---|---|
| 2,244,054 | 6/1941 | Cornell | 277/58 |
| 2,650,615 | 9/1953 | Nesham | 251/366 |
| 2,665,874 | 1/1954 | MacGregor | 251/366 |
| 3,288,473 | 11/1966 | Hinds | 277/79 |

Primary Examiner—Herbert F. Ross
Assistant Examiner—Robert I. Smith
Attorney—Glenn K. Robbins

[57] ABSTRACT

A valve stem seal assembly to prevent and stop leakage around a valve stem by encircling the valve stem at a bolted gland. The seal assembly is fitted on top of the bonnet to enclose the valve stem and a sealant compound is forced through an inlet opening into the seal assembly fitting into sealant channels around the valve stem to provide primary sealing around the stem and a secondary sealing at the bottom of the assembly housing fitting into the bonnet. The packing gland fits on top of the valve stem seal assembly and provides a secondary seal around the valve stem at the top of the valve stem seal assembly. The inlet fitting to provide for the conduction of the sealant into the valve stem seal assembly is provided with a T-fitting in order that sealant can be injected under pressure. A threaded bolt valve is adapted to close the T-fitting while the sealant is under pressure to provide for closure and increase in the sealant pressure in the closing operation. Besides use on valves the gland may also be used on all types of pumps such as piston pumps, also the steam cut off rods on steam pumps and electrical centrifugal pumps. The same procedure would apply as repacking a valve while under pressure.

9 Claims, 8 Drawing Figures

PATENTED JUN 12 1973  3,738,666
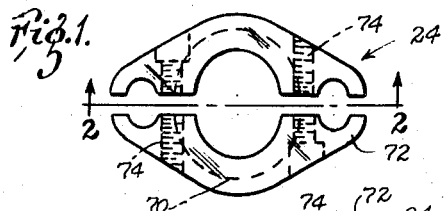
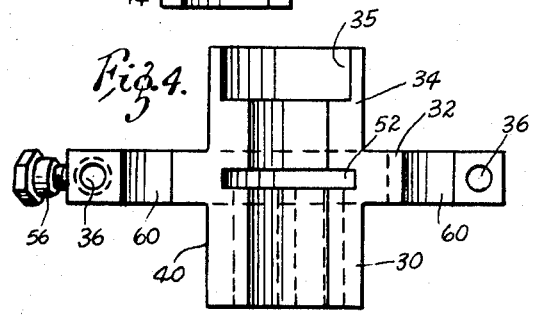
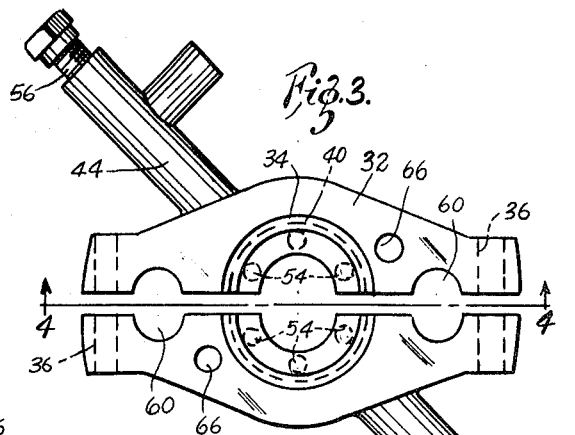
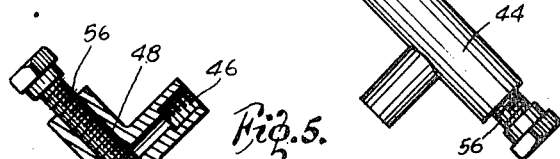
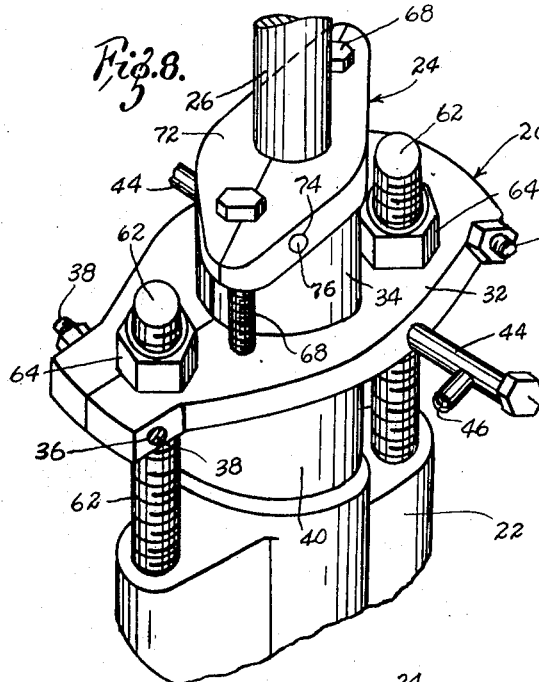
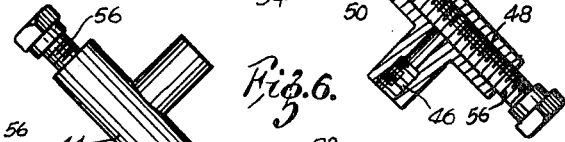
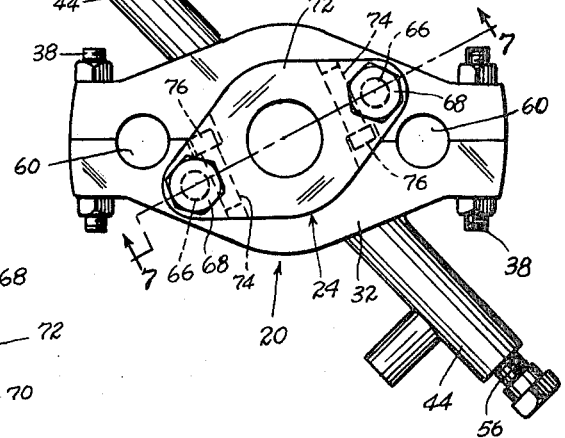
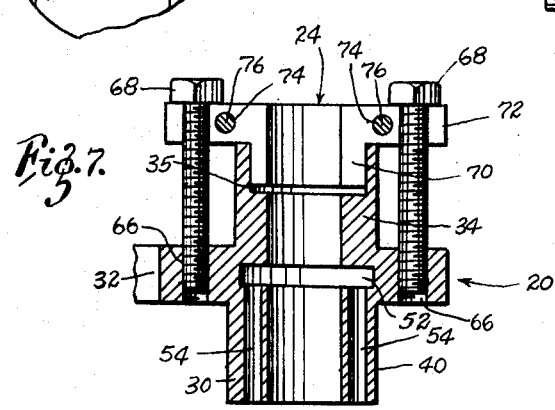

VALVE STEM SEAL ASSEMBLY

SUMMARY OF THE INVENTION

In the past various types of valves have been provided which have conventionally employed packing glands. The packing glands have been subject to leakage because of insufficient pressure in the packing whereby the fluid in the valve under pressure or corrosive action can leak through the packing gland.

By means of this invention, there has been provided a specially designed valve stem seal assembly which fits in a conventional bonnet. The valve stem seal assembly is adapted to receive sealant under high pressure to be injected around the valve stem and at the bottom of the valve stem seal assembly at the interface with the bonnet. A packing gland is received at the top of the valve stem seal assembly to provide for use of conventional packing and provides secondary sealing around the upper portion of the valve stem. Bolt connections are employed to connect the valve stem seal assembly to the bonnet and to provide for connection of the packing gland to the upper portion of the valve stem seal assembly.

The sealant is designed to be introduced under high pressure into inlets in the valve stem seal assembly to provide for a primary seal on the inside of the valve stem seal assembly around the valve stem. A specially designed T-fitting has a threaded opening receiving a sealant gun for injection of a sealant under high pressure while another fitting receives a bolt valve which is adapted to open and close the sealant inlet. In the closure operation the bolt valve which can be grasped by a wrench or the like closes the sealant inlet to the sealant gun to effectively close the inlet passageway and provide a sealed connection to maintain the sealant under high pressure.

The valve stem seal assembly is adapted for use in conventional valves by connection to the bonnet with provision for reception of a packing gland at the top of the valve stem seal assembly. The installation can be effected for various types of fluid at different pressures and under different conditions of temperature and corrosion. The installation is rugged and can be employed in various types of installation without the use of any complicated equipment and the employment of only conventional wrenches. Besides use of valves the gland may also be used on all types of pumps such as piston pumps, also the steam cut off rods on steam pumps and electrical centrifugal pumps. The same procedure would apply as repacking a valve while under pressure.

The above features are objects of this invention and further objects will appear in the detailed description which follows and will be otherwise apparent to those skilled in the art.

For the purpose of illustration of this invention, there is shown in accompanying drawings a preferred embodiment thereof. It is to be understood that these drawings are for the purpose of example only and that the inventin is not limited thereto.

IN THE DRAWINGS

FIG. 1 is a top plan view of the packing gland.

FIG. 2 is a view in front elevation of the packing gland.

FIG. 3 is a top plan view partially in section of the valve stem seal housing.

FIG. 4 is a view in side elevation of the valve stem seal assembly.

FIG. 5 is a view in horizontal section the valve stem seal assembly taken through the axis of the sealant inlet showing the bolt valve in full lines.

FIG. 6 is a top plan view of the valve stem seal assembly with the packing gland attached.

FIG. 7 is a view in section taken on the line 7—7 of FIG. 6.

FIG. 8 is a pictorial view of the valve stem seal assembly and packing gland attached to the bonnet of the valve.

DESCRIPTION OF THE INVENTION

The valve stem seal assembly of this invention is generally identified by the reference numeral 20 in FIG. 8 and shown attached to the bonnet 22 of a valve. The packing gland 24 fits on the upper portion of the valve stem seal assembly with the whole unit providing for sealant protection for a valve stem 26 projecting upwardly through the bonnet, the valve stem seal assembly, and the pakcing gland.

The valve stem seal assembly 20 is best shown in FIGS. 3, 4, 5, 7, and 8. It is comprised of a body 30 of thick walled tubular construction, flange 32 and an upper cup shaped body 34 having a cupped opening 35. The assembly is made in halves with openings 36 at the end of the flanges which receive connecting bolts 38 to draw the halves together. The bottom housing 30 has an inside diameter closely fitting over the valve stem while the outside wall 40 is closely received within the cup shpaed opening of the bonnet 22.

As best shown in FIGS. 3, 4, and 5 a T-shaped fitting 44 is provided for insertion of a sealant under high pressure into the valve stem seal assembly. The T-shaped fitting 44 has a threaded opening 46 for reception of a sealant gun and a threaded opening 48 for reception of a bolt valve. The threaded opening 48 is axially aligned with the main inlet 50 which communicates with an annular or concentric channel like grooved opening 52 fitting around the valve stem. The channel like opening 52 is provided with axially aligned circumferential passages 54 to provide for the passage of sealant through the bottom housing 30 to the interface with the cup shaped opening of the bonnet. The threaded bolt valve 56 is used for opening and closing the T-shaped opening and has a hexagonal head for reception of wrench in tightening.

The valve stem seal assembly is provided with openings 60 at the ends of the flange for reception of a bolt 62 extending from the bonnet through the openings. A tightening nut 64 is used to clamp and tighten the flange of the valve stem seal assembly and force it into the bonnet. Tapped openings 66 are provided on the upper faces of the flange portion of the valve stem seal assembly for reception of tightening bolts 68 to connect packing gland 24 into tight relationship in the cup shaped opening 35 of the upper housing of the valve stem seal assembly.

The packing gland 24 is best shown in FIGS. 1, 2, 6, and 8 and is comprised of two halves identical in construction. They provide a tubular body 70 which nests within the cup shaped opening of the upper housing 34 of the valve stem seal assembly and a flange 72. The flange 72 is provided with a tapped opening 74 for each packing gland halve for reception of a tightening bolt 76 to draw the two halves of the packing gland together.

Use

The valve stem seal assembly of this invention is adapted for simple installation in a conventional valve with the use only of a wrench. In the installation, the previously employed packing gland is first removed from bonnet and the valve stem seal assembly is fitted around the valve stem and nested within the cup shaped opening of the bonnet 22. The two halves are then clamped together by fitting the connecting bolts therethrough and tightening the nuts 38. The valve stem seal assembly is then forced into the cup shaped opening and the nuts 64 are tightened against the bolt 62 passing through the flange to force the valve stem seal assembly downwardly.

After this installation, the packing gland 24 is then inserted. The two halves of the packing gland are fitted around the valve stem and the bolts 76 are tightened into the tapped opening 74 to force the two halves of the packing gland together. The packing gland is then forced downwardly into the cup shaped opening 35 of the upper housing of the valve stem by tightening the bolts 68 fitting through the flanges of the packing gland into the tapped openings of the flange on the upper face of the valve stem seal assembly.

Sealant is then forced into the valve stem seal assembly by an appropriate sealant gun fitting into the threaded opening 46 of the T-fitting. This is accomplished after the bolt valve 56 is withdrawn from the closed position shown in FIG. 5 to provide for communication of the sealant inlet with the main channel 50. The sealant is then forced into the annular opening 52 around the valve stem to provide a primary seal around the valve stem and through the vertical passages 54 to the bottom of the valve stem seal assembly at the interface with the cup shaped opening of the bonnet to provide for a secondary seal.

While pressure is still applied on the sealant gun the bolt valve 56 is closed past the sealant opening to the position shown in FIG. 5. In this closure operation, loss of pressure is prevented and actually pressure is increased by the piston action of the bolt valve in the main channel 50. The sealant gun is then withdrawn and the installation is completed.

Various changes and modifications may be made within the scope and teaching of this invention as defined by the claims appended hereto.

What is claimed is:

1. A valve stem seal assembly for sealing a valve stem above a valve bonnet, said assembly comprising a split housing receivable upon the bonnet and closely fitting around the valve stem, said housing provided with an outwardly extending flange, said flange being provided with tighening means for forcing the housing tightly into the bonnet, said housing having a shallow annular groove fitting around the valve stem and means for filling said groove with a fluid sealant under pressure comprising a fitting for a sealant gun, said fitting having a bifuracted passageway providing first and second passages opening to the atmosphere and a main passageway communicating with said annular groove, the first of said passages receiving the sealant gun and the second passage receiving a reciprocal valve member operable to open and close the main passage and said first passage.

2. The valve stem of claim 1 in which the housing is provided with a cup shaped opening at the top receiving a split packing gland fitting around the valve stem.

3. The valve stem of claim 2 in which the packing gland is provided with tightening means for forcing it tightly into the cup shaped opening of said housing.

4. The valve stem of claim 1 in which a plurality of axially aligned passageways communicate the annular groove with the bottom of the housing to provide for passage of the sealant under pressure to the interface between the bottom of the housing and the bonnet.

5. The valve stem of claim 1 in which the fitting is provided on the flange of the housing and said main passageway is directed radially through the flange into said annular groove.

6. The valve stem of claim 1 in which the second passage is axially aligned with the main passage and is threaded to receive the reciprocal valve member, said valve member being threadedly receivable in said main passage to close the first passage and being reciprocable to open said first passage.

7. The valve stem of claim 6 in which the valve member is in the form of a threaded bolt having a manually engageable exposed end.

8. The valve stem of claim 7 in which the manually engageable exposed end has a polygonal cross section for reception of a wrench.

9. The valve stem of claim 6 in which the fitting is in the form of a tee with the main passage and second passage being axially aligned and forming the head of the tee and the first passage forming the stem of the tee, the main passage being threaded adjacent the first passage and forming a continuation of the threading in the second passage and said threaded bolt being advanceable into said main passage to close the first passage and retractable into the second passage to open it.

* * * * *